Figure 1:
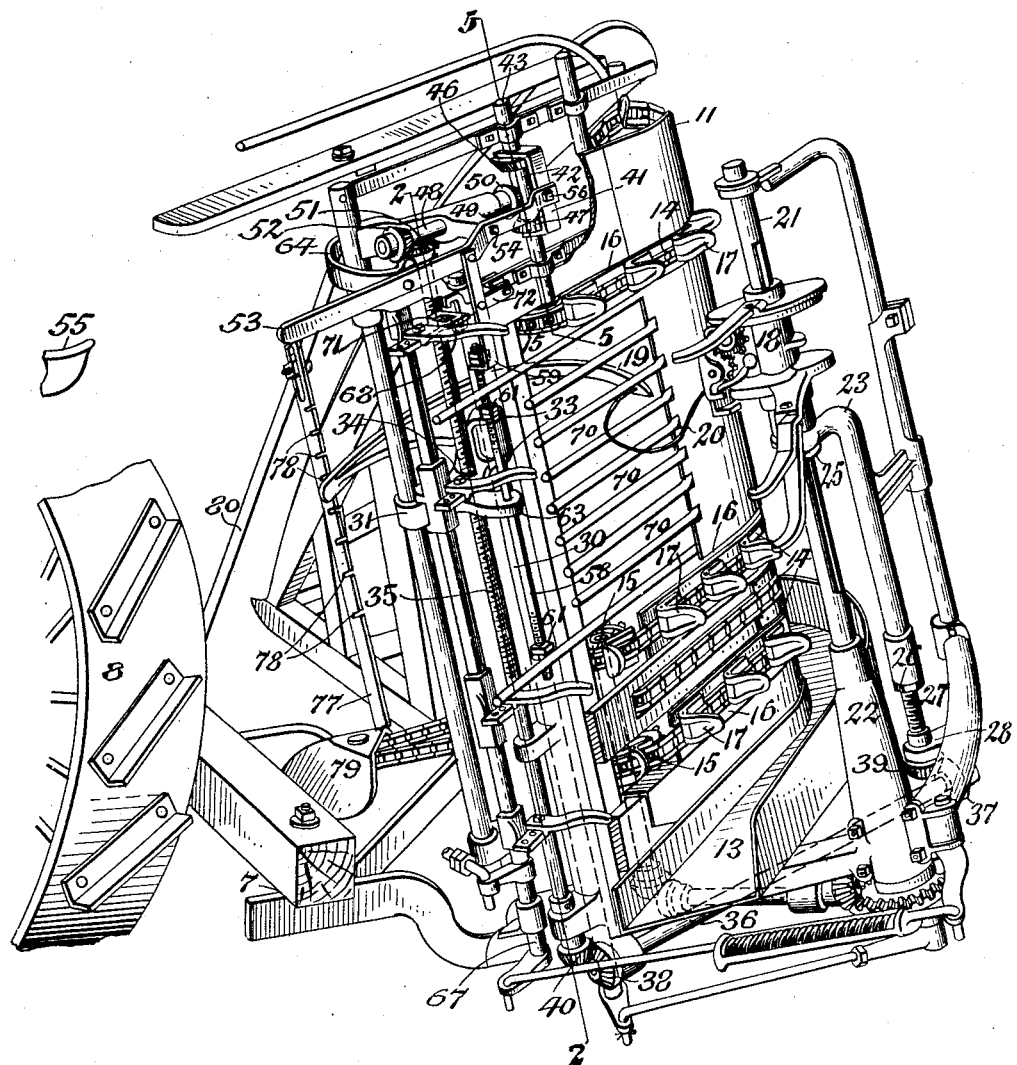

C. MAUL.
HARVESTER.
APPLICATION FILED OCT. 14, 1919.

1,389,769.

Patented Sept. 6, 1921.
2 SHEETS—SHEET 1.

Inventor
Christian Maul
by Leeper & Popp
Attorneys

C. MAUL.
HARVESTER.
APPLICATION FILED OCT 14, 1919.

1,389,769.

Patented Sept. 6, 1921.
2 SHEETS—SHEET 2.

Inventor
Christian Maul
by Leeper & Popp
Attorneys

UNITED STATES PATENT OFFICE.

CHRISTIAN MAUL, OF BATAVIA, NEW YORK, ASSIGNOR TO MASSEY-HARRIS HARVESTER COMPANY, INC., OF BATAVIA, NEW YORK, A CORPORATION OF NEW YORK.

HARVESTER.

1,389,769.  Specification of Letters Patent.  Patented Sept. 6, 1921.

Application filed October 14, 1919. Serial No. 330,550.

*To all whom it may concern:*

Be it known that I, CHRISTIAN MAUL, a citizen of the United States, residing at Batavia, in the county of Genesee and State of New York, have invented new and useful Improvements in Harvesters, of which the following is a specification.

This invention relates more particularly to a corn harvester of the type in which the stalks of corn are carried in a substantially upright position from the cutter mechanism at the front of the machine to the bundling and tying mechanism at the rear end thereof, although the same may also be used to advantage in other types of machines of this character.

Heretofore the needle and knotter mechanism of the means which tied the band around the bundles was adjusted by hand transversely of the binder deck for the purpose of adapting the harvester to the length of the particular corn which was being harvested which involved not only considerable delay in the harvesting operation when frequent adjustment of the tying mechanism was necessary due to irregularity in the length of the crop in different parts of the field, but was also objectionable on account of the burden placed upon the operator to effect such adjustment manually.

It is the object of this invention to provide means whereby the shifting of the tying mechanism crosswise of the binder deck is effected by power derived from the same source which operates the stalk cutter, conveyer and tying mechanism, which shifting mechanism is so organized that the same may be started and stopped manually by the operator and is also combined with an automatic locking device which prevents the tying mechanism from operating while the same is being adjusted, means being also provided for automatically disengaging the tier adjusting mechanism from the power driving mechanism at the end of the adjusting movement in either direction, and thus preventing breaking of any parts in case the operator neglects to disengage the tier adjustment mechanism from the power driving mechanism.

In the accompanying drawings:

Figure 1 is a fragmentary perspective view of a corn harvester from the rear equipped with the preferred form of my improvements. Fig. 2 is a fragmentary vertical transverse section of the harvester, taken substantially on line 2—2, Fig. 1. Fig. 3 is a fragmentary sectional perspective view of the means for coupling and uncoupling the tier adjusting mechanism and the power driving mechanism, and also the means for locking the tier mechanism against operation. Fig. 4 is a fragmentary horizontal section, on an enlarged scale, taken on line 4—4, Fig. 3. Fig. 5 is a fragmentary vertical section, on an enlarged scale, taken on line 5—5, Fig. 1.

Similar characters of reference indicate corresponding parts in the several views.

This invention is applicable to various forms of harvesters for cutting and bundling fodder, corn or similar crops, that shown in the drawings for example, comprising a carriage having a main frame 7 which is supported on one side by means of a master wheel 8 and a platform or binder deck 11 which extends from the cutting mechanism at the front of the platform rearwardly and laterally toward the stubbleward side of the machine to the tying mechanism which places the band around each bundle of stalks. As the machine moves forwardly the stalks are cut off by the cutter mechanism and then moved rearwardly in a substantially upright position along the binder deck during which time the butt ends of the stalks rest upon and slide over the bottom or lower guide 13 arranged at the lower edge of the deck. This rearward movement of the stalks may be effected by any suitable means but preferably by means of a conveyer comprising a plurality of chain belts 14 arranged in rear of the binder deck and passing around sprocket wheels 15 and provided with feeding wings or fingers 17 which project through longitudinal slots 16 in the binder deck so as to engage the stalks and propel the same rearwardly along the deck from the cutter mechanism to the bundle forming mechanism arranged adjacent to the rear or delivery part of the binder deck.

The bundle tying or binding mechanism which is shown in the drawings as typical of one suitable for this purpose comprises a knotter 18 which is arranged opposite the front side or face of the rear or delivery portion of the binder deck and a needle 19 which is mounted in rear of this portion of the deck and is adapted to swing across the path of the stalks and coöperate with the knotter and pass the twine or band around successive bundles of stalks and secure the ends of the band of each bundle together in the form of a knot, this mechanism being of any suitable and well known construction and similar to that commonly employed in machines of this type.

The knotter is mounted on the upper end of an upright knotter shaft 21 which is arranged parallel with the rear or delivery portion of the deck and is capable of longitudinal adjustment on this shaft or parallel with the plane of the deck, but operatively connected with this shaft so that the knotter may be shifted into different positions relatively to the bottom 13 of the binder deck for the purpose of tying bundles of stalks at different distances from their butt ends to suit the length of the same. The lower end of the knotter shaft is journaled in a bearing or knotter standard 22 which forms part of the tier frame and is rotated in the proper direction by any suitable mechanism by motion which is derived from the master wheel.

The means shown in the drawings for effecting the raising and lowering of the knotter mechanism so that the same may be shifted into different positions relative to the width of the binder deck comprise a yoke 23 movable transversely of the deck but parallel with the plane thereof and having an arm which embraces the hub or sleeve 25 of the knotter mechanism and an upright screw 27 which is engaged at its upper externally threaded end with a screw nut 26 mounted in the lower tubular part of said yoke while its lower circular part is journaled in a bearing 28 on the adjacent part of the tier frame so that this screw is capable of turning in this bearing but is incapable of moving lengthwise therein. Upon turning the screw 27 in one direction or the other yoke 23 together with the knotter mechanism is raised or lowered but the driving connection between the working parts of the knotter mechanism and the knotter shaft is not disturbed.

The means for operating the needle is so constructed that the same is capable of being raised and lowered to suit the position of the knotter mechanism and still maintain the driving connection between this needle and its operating mechanism. For this purpose the hub 29 of the needle is splined on the upright needle rock shaft 30 which is arranged transversely in rear of the delivery portion of the binder deck and journaled in suitable bearings on the tier frame and the deck frame so as to be capable of turning but incapable of lengthwise motion. The longitudinal movement of the needle on the needle shaft is effected by means of a needle yoke having a hub 31 which slides on an upright guide rod 32 secured to the tier frame and deck frame parallel with the needle shaft, two shifting collars 33, 33, which receive the needle shaft and engage with the upper and lower ends of the needle hub and a screw nut 34 arranged adjacent to said collars, and a needle adjusting screw 35 arranged in rear of the delivery portion of the binder deck and engaging with the screw nut 34 and journaled at its upper and lower ends in suitable bearings on the deck frame so that the needle adjusting screw is only capable of turning but cannot move lengthwise of its axis. By this means a turning motion of the needle adjusting screw 35 will cause the needle yoke and the needle to be raised or lowered for adjusting the needle into the desired position transversely of the binder deck and parallel with the plane thereof. An oscillating motion is imparted to the needle rock shaft by power derived from the master wheel in any suitable manner.

For the purpose of causing the needle and knotter to be raised and lowered in unison so that they are always retained in the proper operative relation when shifted into different positions transversely of the binder deck and parallel with the plane thereof, the knotter adjusting screw 27 and the needle adjusting screw 35 are operatively connected so that they turn together, this being preferably accomplished by means of a transverse coupling shaft 36 arranged underneath the bottom of the deck and journaled in suitable bearings on the tier frame and provided at its opposite ends with bevel gear wheels 37, 38 which mesh with corresponding bevel gear wheels 39, 40 at the lower ends of the knotter and needle adjusting screws, as shown in Figs. 1 and 2.

Means are provided for effecting the adjusting movement of the needle and knotter mechanism by power instead of manually, which means are however under the control of the operator while occupying the machine, which means are constructed as follows:

42 indicates the sleeve of a reversing gear or clutch which slides lengthwise on one of the shafts of the machine which is turned by power derived from the master wheel 8, for instance the shaft 43 to which is secured the rearmost sprocket wheel 15 of the uppermost stalk conveyer belt 14 arranged along the rear or delivery part of the binder deck. This sleeve is splined to turn with the shaft but free to slide thereon by means of a pin 44 passing through the same and a longitudinal slot 45 in this shaft, as shown in Fig. 5 and the same is provided with upper and lower reversing driving bevel gear wheels 46, 47, which taper toward each other. 48 represents a horizontal intermediate shaft journaled lengthwise in a bearing 49 on the upper part of the main frame and provided at its front end with a driven bevel gear wheel 50 which is arranged between the driving bevel gear wheels 46, 47. At its rear end the shaft 48 is provided with a driving bevel gear wheel 52 which meshes with a driven bevel gear wheel 51 on the upper end of the screw shaft 35.

When the sleeve 42 is in its central position in which neither of its driving gear wheels 46, 47 engage with the driven gear wheel 50, as shown in Figs. 1, 3 and 5, the intermediate shaft 48 remains at rest and the needle and knotter mechanism remain in the position in which they have been placed for tying a band around each bundle at a predetermined point between its ends. Upon moving the sleeve 42 upwardly and engaging its lower driving gear wheel 47 with the intermediate driven gear wheel 50 motion will be transmitted from the stalk conveyer mechanism to the needle and knotter mechanisms, so as to raise the tying mechanism and cause the band to be tied around each bundle at a greater distance from the lower end thereof and upon moving this sleeve downwardly so as to engage the upper driving gear wheel 46 with the intermediate gear wheel 50 then the motion which is transmitted from the stalk conveyer to the needle and knotter will cause the same to be lowered so that a band will be tied around each bundle nearer to the lower end thereof.

This shifting of the sleeve 42 is preferably effected by a vertically-swinging lever 53 which is pivoted by a screw 54 to a suitable part of the main frame and has its rear arm arranged within convenient reach of the driver while the latter is occupying the seat 55 of the machine, and thus permits the driver to operate the controlling clutch which operates the tier adjusting mechanism without necessitating dropping of the lines of the team which is drawing the harvester. The inner arm of the gear shifting lever is connected by a pin 56 with the central part 41 of a U-shaped yoke, the ends 57 of which are constructed in the form of eyes which receive the shaft 43 and engage with the opposite outer ends of the sleeve 42. By this means the reversing gears 46, 47 are compelled to move lengthwise on the shaft 42 with the adjusting lever but are free to turn independently of the same. Means are provided whereby the tier adjusting mechanism is automatically disengaged from the power operating mechanism when the tying mechanism reaches the upper and lower ends of its adjusting movement and thus prevents breakage of any parts in the event that the attendant neglects to manually disengage the tier adjusting mechanism from the power operating mechanism. In its preferred form, this automatic disengaging mechanism comprises an upright screw threaded shipper rod 58 which has its upper end provided with an extension bar 59 forming practically a part thereof and pivotally connected by a pin 60 with the outer arm of the gear shifting lever 53. On its upper and lower parts this shipper rod is provided with screw nuts 61, 62 forming adjustable tappets and the central part of this rod passes through an eye 63 on the hub 31 of the needle shifting yoke. The tappets 61, 62 are so adjusted on the shipper rod 58 that when the needle is effecting the last part of the downward movement for which the same has been set, then the eye 63 engages the lower tappet 62 and causes the lever 53 to be moved from one end of its stroke to its central neutral position and disconnect the tier adjusting mechanism from the power mechanism, and when the needle is effecting the last part of its upward movement the eye 63 of the needle yoke will engage the upper tappet 61 and move the lever 53 from the opposite end of its stroke to its central position and disconnect the tier adjusting mechanism from the power mechanism.

It is desirable to provide means which operate to yieldingly hold the gear shifting lever 53 in its neutral or central position and which operate to automatically interlock with the lever after the same is moved from either extreme of its stroke to its central position. These means preferably comprise a C-shaped detent spring 64, one end of which is secured to the main frame of the machine while its other end is arranged adjacent to the outer arm of the lever 53 and is provided with a locking pin 65 having a rounded or tapering end which is adapted to engage with an opening 66 in the outer arm of said lever when the latter is in its neutral or central position, as shown by full lines in Figs. 1, 3 and 4. When it is desired to couple the tier adjusting mechanism with the power mechanism, this is accomplished most easily by pressing the lever laterally away from the detent spring at the same time that this lever is pressed upwardly or downwardly, thereby disengaging this lever from the locking pin and moving the same for coupling the tier adjusting mechanism with the power mechanism. When this lever is returned from either end of its stroke to the central neutral position either manually or automatically, the outer arm of this lever by the wedge or cam action between the same and the locking pin 65, deflects this lever and the spring 64 laterally relatively to each other until the opening 66 of this arm is in line with said pin when the lever and detent spring will snap together and cause the pin 65 and hole 66 to automatically interlock and hold the lever yieldingly in its central position.

67 represents the rocking compressor or trip shaft which carries a plurality of compressor or trip arms 68 adjacent to the rear or discharge end of the binder deck. This compressor shaft is arranged parallel with the needle shaft and adjacent thereto and its upper and lower ends are journaled in bearings on the adjacent part of the main frame. These compressor arms are associated with other elements of a trip mechanism of the usual and well known construction, so that when the pressure of the stalks against the same exceeds a predetermined degree, the compressor shaft will be tripped and turned for setting in motion the devices which cause the tying mechanism to effect a cycle of operations.

In order to permit the needle to coöperate with the knotter mechanism in different positions crosswise of the binder deck the latter is provided with a plurality of longitudinal slots 70 through any one of which the needle may move across the path of the stalks and coöperate with the knotter for placing a band around a bundle of stalks and tying the ends of the band together.

For the purpose of preventing the tying mechanism from operating while the same is being adjusted vertically to suit the length of the stalks which are being harvested, locking means are provided for holding the compressor arms across the path of the stalks at the discharge end of the deck during such adjustment. These locking means in their preferred form comprise a locking eye 71 connected with the uppermost compressor arm 68 and a locking arm 72 pivoted at one end by a pin 73 on the main frame to swing vertically and pivotally connected by a pin 74 with the extension bar of the shipper rod and provided at its opposite end with two locking hooks 75, 76, which project toward each other adjacent to the locking eye 71 but are separated from each other by a space or gap. These parts are so constructed and arranged relatively to each other that when the reversing gears 46, 47 are in the neutral position, the locking lever which is operatively connected therewith will also be in its neutral position in which neither of its hooks 75, 76 engage with the eye 71, thereby leaving the compressor shaft and its arms 68 free to be turned by the stalks when a sufficient pressure is exerted against the same by the advancing and accumulating stalks to form a bundle, which tripping of the compressor shaft causes the tying mechanism to operate and place a band around the bundle. When however the shifting lever 53 is moved either upwardly or downwardly out of its central position for causing the reversing gearing to either raise or lower the tying mechanism, then the locking arm 72 is turned so that either its upper hook 75 or its lower hook 76 engages with the locking eye 71. When the tying mechanism has been adjusted to the desired position and the reversing gearing has been again thrown out of action, the locking arm is restored to its neutral position which releases the eye 71 and permits the compressor mechanism to again trip the tying mechanism for resuming tying bands around the bundles. By thus preventing the tying mechanism from effecting a tying operation while the adjustment of the same is taking place, breakage of the platform or binder deck or the needle cannot occur because the needle at this time is wholly retracted from all the slots 70 in the binder deck and consequently cannot break the parts of the deck between one of these slots and another, which otherwise would occur as well as damage to the needle and associated parts.

It is desirable to enable the operator to determine the position of the tying mechanism relatively to the binder deck and also to shift the tying mechanism to a predetermined position for tying a band around the bundle at the desired distance from the butt end. A suitable indicating means for this purpose consists in arranging an index bar 77 parallel with the needle shaft adjacent to the path of the needle, so that the latter sweeps with its outer edge close to this index bar. The latter is provided on its rear upright edge with index notches or indicating notches 78 which correspond to the slots 70 in the binder deck so that when the needle is in line with one or another of these notches the operator knows that the needle will pass through the predetermined slot, thus enabling the machine to be set readily and properly for binding bundles at a certain distance from the butt ends thereof. The index bar is preferably mounted at its lower end on an adjacent gear cover 79 and its upper end is connected with an adjacent brace 80 of the main frame, as shown in Fig. 1.

I claim as my invention:

1. A harvester comprising a binder deck, a bundle tying mechanism, means for adjusting said tying mechanism transversely and parallel with the plane of said deck, including a driven shaft, a power mechanism including a driving shaft, an intermediate shaft, a pair of intermeshing gear wheels connecting said intermediate shaft and driven shaft, and means for operatively connecting said driving shaft and intermediate shaft including a driven gear wheel arranged on the intermediate shaft, a sleeve splined on the driving shaft and provided with two driving gear wheels adapted to engage with opposite sides of said driven gear wheel, and means for shifting said sleeve comprising a lever operatively connected with said sleeve, and means for holding said lever yieldingly in its neutral position.

2. A harvester comprising a binder deck, a bundle tying mechanism, means for adjusting said tying mechanism transversely and parallel with the plane of said deck, including a driven shaft, a power mechanism including a driving shaft, an intermediate shaft, a pair of intermeshing gear wheels connecting said intermediate shaft and driven shaft, and means for operatively connecting said driving shaft and intermediate shaft including a driven gear wheel arranged on the intermediate shaft, a sleeve splined on the driving shaft and provided with two driving gear wheels adapted to engage with opposite sides of said driven gear wheel, and means for shifting said sleeve comprising a lever operatively connected with said sleeve, and means for holding said lever yieldingly in its neutral position consisting of a spring provided with a tapering locking pin adapted to engage with a locking opening in said lever.

3. A harvester comprising a binder deck, a bundle tying mechanism, an adjusting device for adjusting said bundle tying mechanism transversely and parallel with the plane of the deck, a power mechanism, a coupling device for connecting and disconnecting the power device and said adjusting device, and means for automatically disconnecting said power device and adjusting mechanism, comprising a lever operatively connected with said coupling device, a shipper rod connected with said lever and provided with tappets at its opposite ends, and a shifting member movable with said adjusting device and adapted to engage one or the other of said tappets.

4. A harvester comprising a binder-deck, a tying mechanism for placing bands around bundles of stalks which are being harvested, including a needle, means for adjusting said needle transversely and parallel with the deck, including a yoke which embraces the hub of said needle and has a threaded opening, and a screw shaft engaging said threaded opening, a power mechanism, a coupling device for connecting and disconnecting said power mechanism and adjusting device, a lever operatively connected with said coupling device, a shipper rod connected with said lever and having tappets at opposite ends thereof, and a shifting member moving with said yoke and arranged to engage either of said tappets at either extremity of the adjusting movement of said tying mechanism.

5. A harvester comprising a binder deck, a tying mechanism for placing bands around bundles of stalks which are being harvested, a trip mechanism actuated by the pressure of the stalks which are being harvested and operatively related to said tying mechanism for controlling the latter, a power mechanism, means for adjusting said tying mechanism transversely and parallel with the plane of said deck, a coupling for connecting and disconnecting said power mechanism and tying mechanism adjusting means, and means for locking said trip mechanism in an inoperative position.

6. A harvester comprising a binder deck, a tying mechanism for placing bands around bundles of stalks which are being harvested, a trip mechanism actuated by the pressure of the stalks which are being harvested and operatively related to said tying mechanism for controlling the latter, a power mechanism, means for adjusting said tying mechanism transversely and parallel with the plane of said deck, a coupling for connecting and disconnecting said power mechanism and tying mechanism adjusting means, and means for locking said trip mechanism in an inoperative position while said coupling device is in an operative position.

7. A harvester comprising a binder-deck, a tying mechanism for placing bands around bundles of stalks which are being harvested including a needle, means for adjusting said needle transversely and parallel with the deck including a yoke which embraces the hub of said needle and has a threaded opening and a screw shaft engaging said threaded opening, a power mechanism, a coupling device for connecting and disconnecting said power mechanism and adjusting device, a lever operatively connected with said coupling device, a shipper rod connected with said lever and having tappets at opposite ends thereof, a shifting member moving with said yoke and arranged to engage either of said tappets at either extremity of the adjusting movement of said tying mechanism, a trip mechanism actuated by the pressure of the stalks which are being harvested and operatively related to said tying mechanism for controlling the same and including a rock shaft and compressor arms projecting normally from said rock shaft across the path of the stalks, a locking eye connected with said rock shaft, and a locking arm pivotally connected with said shipper rod and provided with two opposed locking hooks either of which may be engaged with said locking eye upon moving said lever and shipper rod in one direction or the other for either raising or lowering said tying mechanism.

CHRISTIAN MAUL.